United States Patent [19]

Kraus et al.

[11] Patent Number: 4,806,189

[45] Date of Patent: Feb. 21, 1989

[54] COMPOSITE FLUID SEPARATION MEMBRANES

[75] Inventors: Menahem A. Kraus, St. Louis; Chinh N. Tran, St. Ann, both of Mo.

[73] Assignee: Monsanto Company, St. Louis, Mo.

[21] Appl. No.: 640,058

[22] Filed: Aug. 13, 1984

[51] Int. Cl.$^4$ .................. B32B 31/00; B01D 53/22
[52] U.S. Cl. ........................... 156/155; 55/158; 156/308.8; 156/314; 427/214; 427/322; 427/384; 427/407.1
[58] Field of Search ............... 55/16, 158; 210/500.2; 156/155, 308.6, 308.8, 314; 427/214, 299, 322, 327, 372.2, 384, 407.1

[56] References Cited

U.S. PATENT DOCUMENTS

| | | | |
|---|---|---|---|
| 3,616,607 | 11/1971 | Klass et al. | 55/16 |
| 3,648,845 | 3/1972 | Riley | 210/500.2 X |
| 3,657,113 | 4/1972 | Stancell et al. | 55/16 X |
| 3,775,308 | 11/1973 | Yasuda | 210/500.2 X |
| 3,980,456 | 9/1976 | Browall | 55/158 |
| 4,214,020 | 7/1980 | Ward et al. | 210/500.2 X |
| 4,230,463 | 10/1980 | Henis et al. | 55/16 |
| 4,242,159 | 12/1980 | Klimmek et al. | 210/500.2 X |
| 4,440,643 | 4/1984 | Makino et al. | 210/500.2 |

*Primary Examiner*—Robert Spitzer
*Attorney, Agent, or Firm*—Henry Croskell

[57] ABSTRACT

A composite fluid separation membrane having improved fluid permeabilities and a method for preparing same are disclosed. The composite fluid separation membrane is comprised of a porous support in the form of a flat sheet, tube or hollow fiber which is impregnated with a volatile solvent followed by the in situ formation of a separating layer wherein the preimpregnation of the pores of the porous support with the solvent provide a separating layer of substantially uniform thickness and minimum intrusion of the separating layer polymer into the pores of the porous support.

9 Claims, No Drawings

COMPOSITE FLUID SEPARATION MEMBRANES

This invention relates to fluid separation composite membranes which have improved permeability for at least one fluid from a fluid mixture. The invention further relates to process for preparing a composite fluid separation membrane which inhibits intrusion of in situ-formed separating layer polymers into pores of a porous support. In another aspect the invention relates to use of a volatile solvent impregnation of pores of a porous support of a composite membrane before in situ-forming a polymeric separating layer. In yet another aspect, the invention relates to a method of encapsulation resulting in thin uniform coatings of encapsulating materials.

Separating, including upgrading of the concentration of at least one selected fluid from a fluid mixture or fluid with a dissolved solid, is an especially important procedure in view of the demands on the supplies of chemical feedstocks. Frequently these demands are met, for example, by separating one or more desired gases from gaseous mixtures and utilizing the gaseous products for processing. Membranes are presently being employed for selectively separating one or more gases from gaseous mixtures. To achieve selective separation the membrane has to exhibit less resistance to the transport of one or more gases than that of at least one other gas of the mixture. Thus, selective separation can provide preferential depletion or concentration of one or more desired gases in the mixture with respect to at least one other gas and therefore provide a product having a different proportion of the one or more desired gases to the at least one other gas than that proportion in the mixture. However, in order for selective separation of the one or more desired gases by the use of separation membranes to be commercially attractive, the membranes must not only be capable of withstanding the conditions to which they may be subjected during the separation operation, but also must provide an adequately selective separation of the one or more desired gases at a sufficiently high flux, i.e., permeation rate of the permeate per unit surface area, so that the use of the separation procedure is on an economically attractive basis. Thus, separation membranes which exhibit adequately high selective separation, but undesirably low fluxes, may require such large separating membrane surface area that the use of these membranes is not economically feasible. Similarly separation membranes which exhibit a high flux, but low selective separation are also commercially unattractive. Accordingly, work has continued to develop separation membranes which can provide both an adquately selective separation of the one or more desired gases and a sufficiently high flux such that the use of these separation membranes on a commercial basis is economically feasible.

In general, the passage of a fluid (gas, vapor, liquid) through a membrane may proceed through pores, i.e., continuous channels for fluid flow in communication with both feed and exit surfaces of the membrane (which pores may or may not be suitable for separation by Knudsen flow or diffusion); in another mechanism, in accordance with current views of membrane theory the passage of a gas through the membrane may be by interaction of the gas with the material of the membrane. In this latter postulated mechanism, the permeability of a gas through a membrane is believed to involve the solubility of the gas in the membrane material and the diffusion of the gas through the membrane. The permeability constant for a single gas is presently viewed as being the product of the solubility and diffusivity of that gas in the membrane. A given membrane material has a particular permeability constant for passage of a given gas by the interaction of the gas with the material of the membrane. The rate of permeation of the gas, i.e., flux, through the membrane is related to the permeability constant, but is also influenced by variables such as the membrane thickness, the physical nature of the membrane, the partial pressure differential of the permeate gas across the membrane, the temperature and the like.

It has been realized that materials which exhibit good separation of gases often have lower permeability constants compared to those of materials exhibiting poor separation of gases. In general, efforts have been directed to providing the material of a gas separation membrane in as thin a form as possible, in view of the low permeabilities, in order to provide adequate flux yet provide a membrane as defect-free as possible, such that gases are passed through the membrane by interaction with the material of the membrane.

Presently gas separating membranes are of two types; one being separating membranes of an asymmetric structure consisting of a unified thin separating layer and a porous substructure. These include dried reverse osmosis membranes and coated or multicomponent membranes according to U.S. Pat. No. 4,230,463. Although successful in many applications, this structure in which separating layer and support layer are made of the same polymer, has some important limitations. These limitations concern mainly preparation difficulties and the membranes' resistance to harsh operating conditions or feed contaminants. Making a good asymmetric membrane by the common solution spinning or casting method involves complicated phase relationships, sometimes making it an impossible task. The asymmetric structure is prone to densification and hence loss of permeability by the action of various contaminants or of major feed components. The second type is a composite membrane, in which porous substrate and membrane are made in different steps and, when desired, from different materials. This conceptually offers much higher flexibility in the choice of materials for the different layers and possibly better individual control of layer thicknesses. For example, a weak (rubbery) or brittle membrane with good transport properties can be supported on a tough porous support or substrate, thus providing a composite membrane with both excellent transport and mechanical properties.

In reverse osmosis it was realized long ago that the concept of a composite membrane offers important advantages. In such a membrane a thin selective polymer layer is deposited on a porous support wherein the superimposed membrane provides the desired separation, i.e., the superimposed membrane is semi-permeable. The superimposed membranes can conceptually be sufficiently thin, i.e., ultrathin, to provide reasonable fluxes. The essential function of the porous support is to support and protect the superimposed membrane without harming the delicate, thin superimposed membrane. Suitable supports provide low resistance to permeate passage after the superimposed membrane has performed its function of selectively separating the permeate from the feed mxiture. Thus, these supports are desirably porous to provide low resistance to permeate passage and yet sufficiently supportive, that is, having pore sizes sufficiently small to prevent the rupture of the superimposed membrane under separating conditions. Some of the advantages of such a structure are the following: the support and the separating membrane can be chosen and optimized independently, for example, the porous support can be inert, strong and environmentally resistant; the selective layer does not need to have superior physical properties. Very thin selective layers are possible, leading to high permeabilities. Since only a small amount of polymer is needed for the thin selective layer more expensive compounds can be used than for asymmetric membranes.

In spite of the versatility of the composite membrane concept little has been done to date on the development of practical composite membranes for gas separations. The main reason for this is probably the difficulty of making fast and selective gas separating membranes: Gas permeabilities of most polymers are low. Normally no ionic rejection mechanisms are operative as in reverse osmosis. Therefore, gas separating membranes are much more sensitive to small defects than reverse osmosis membranes. It is therefore especially difficult to make very thin gas selective membranes. For example, some composite membranes highly selective in reverse osmosis show no selectivity whatsoever to gases. A number of attempts have been made to coat porous substrates by polymer solutions. However, no provisions were made to limit intrusion of the solution into the pores of the support or control the thickness of the coating. Therefore, either selectivities or permeabilities were quite low. Klass, et al. U.S. Pat. No. 3,616,607, Stancell, et al., U.S. Pat. No. 3,657,113 and Yasuda, U.S. Pat. No. 3,775,308 exemplify gas separation membranes having superimposed membranes on a porous support.

A technique has also been developed of casting very thin polymer films on water, then to be picked up on porous supports. Since the films are very hard to handle, multiple applications have to be made and the technique is very hard to scale up.

Such composite membranes for gas separations have not been without other problems. For instance, Browall in U.S. Pat. No. 3,980,456 discloses the fabrication of composite membrane films for separation of oxygen from air comprising a support of microporous polycarbonate sheet and a separately formed, i.e., preformed, superimposed ultrathin separation membrane of 80 percent poly(phenylene oxide) and 20 percent organopolysiloxane-polycarbonate copolymer. In the fabrication of the membranes the exclusion from the manufacturing area of extremely small particulate impurities, i.e., particles below about 3000 angstroms in size, is stated by Browall to be impractical or impossible. These fine particles may be deposited under or between preformed ultrathin membrane layers and, because of their large size in comparison to the ultrathin membranes, puncture the ultrathin membranes. Such breaches reduce the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membrane and the porous polycarbonate support as an adhesive to prevent delamination. Thus the composite membranes of Browall are complex in materials and techniques of construction.

DEFINITION OF TERMS

The composite membranes of this invention comprise a porous support and coatings which have particular relationships. Some of these relationships can conveniently be stated in terms of relative separation factors with respect to a pair of gases for the porous separation membranes, coatings and the composite membranes. A separation factor (a/b) for a membrane for a given pair of gases a and b is defined as the ratio of the permeability constant ($P_a$) of the membrane for gas a to the permeability constant ($P_b$) of the membrane for gas b. A separation factor is also equal to the ratio of the reduced permeability ($P_a/l$) of a membrane of thickness l for gas a of a gas mixture to the reduced permeability of the same membrane to gas b, ($P_b/l$), wherein the permeability for a given gas is the volume of gas at standard temperature and pressure (STP), which passes through a membrane per square centimeter of surface area, per second, for a partial pressure drop of 1 centimeter of mercury across the membrane per unit of thickness, and is expressed as $P = cm^3\text{-}cm/cm^2\text{-}sec\text{-}cmHg$.

In practice, the separation factor with respect to a given pair of gases for a given membrane can be determined employing numerous techniques which provide sufficient information for calcultion of permeability constants or permeabilities for each of the pair of gases. Several of the many techniques available for determining permeability constants, permeabilities, and separating factors is disclosed by Hwang, et al. Techniques of Chemistry, Volume VII, Membranes in Separations, John Wiley & Sons, 1975 (herein incorporated by reference) at Chapter 12, pages 296 to 322.

An intrinsic separation factor as referred to herein is the separation factor for a material which has no pores for gas flow across the material, and is the highest achievable separation factor for the material. Such a material may be referred to as being continuous or nonporous. The intrinsic separation factor of a material can be approximated by measuring the separation factor of a relatively thick compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be lower than the intrinsic separation factor. Accordingly, a "determined intrinsic separation factor " as employed herein refers to the separation factor of a dry, relatively thick compact membrane of the material.

For purposes of this disclosure, the term solvent is used in relationship to the porous support impregnation solvent which is a liquid solvent having a solubility parameter within about ±2 of the solubility parameter of the polymer comprising the separating layer. The solubility parameter is defined in the "Journal of Applied Chemistry", Volume 3, page 71, February, 1953; P. A. Small. The term minimum intrusion which relates to the amount of polymer which enters and forms a portion of the separating layer in pores of the porous support is definable in permeability results improvement wherein the composite according to the invention exhibits an improved permeability of at least 50% or more as compared to a composite membrane formed without solvent impregnation.

BRIEF STATEMENT OF THE INVENTION

The present invention is comprised of a composite fluid separation membrane and a method for preparing same which consists of impregnating a porous support in the form of a flat sheet, the tube or hollow fiber with a liquid of relatively high vapor pressure, which is either a solvent or a weak non-solvent for the separating layer polymer, and which is miscible with a polymer solution for an in situ-formed separating layer polymer. The impregnation of the pores of the porous support is quickly followed by an application of a polymer solution to one or both surfaces of the impregnated porous support. Both solvents, i.e., the impregnation solvent and the solvent forming the polymer solution which forms the membrane are allowed to evaporate. In this manner, thin fluid separating membranes can be made as shown in the examples.

The process of using an impregnation solvent is also suitable for encapsulation technology wherein a porous support material loaded with catalysts, medications, herbicides, insecticides, fertilizers, and the like is encapsulated with an ultrathin, uniform membrane. For example, porous glass beads have been used for catalyst support purposes; however demands on various catalyst systems have necessitated use of encapsulation technology for longer life and protection of the catalyst. In order to achieve these needs, membrane encapsulation technology is suitable. The solvent impregnation process according to the invention provides a suitable and useful tool for achieving ultrathin encapsulation membranes for catalyst impregnated glass beads and other measured release applications wherein a porous material is utilized.

Preferentially the impregnating solvent and the porous substrate will have low interfacial surface tension and a low interfacial tension will exist between the solvent impregnated support and the polymer coating solution which in situ forms the separating layer. The low interfacial surface tension relationship, for example, a contact angle of equal to or less than 90°, leads to good spreading of the polymer coating solution and wetting of the porous support surface. Choice of the correct concentration/viscosity of the coating solution is also important in preparing separating layers which are substantially uniform in thickness, for example, concentrations which are too low result in poor adhesion and imperfect membranes while high concentration solutions result in poor flow of coating solution, thus, thick separating layers.

Choice of the respective polymer solvent and impregnating solvents is also important in selecting those solvents which have similar boiling point ranges. However, if the boiling point range of the solvents is too low, evaporation from the porous support of the impregnation solvent occurs before coating and evaporation from the coating solution leads to increased concentrations, i.e., coating thicknesses. Boiling ranges which are relatively high leads to long residence time of the solvent of the polymer solution resulting in intrusion of the polymer into the porous support by diffusion means. Preferentially the impregnation solvent will have a boiling point of from about 40° C. to about 100° C. at atmospheric pressure. Higher boiling solvent systems could be used depending on the polymers selected for the separating layer and material of the porous substrate. The method utilized in the invention inhibits volumetric flow of polymer solution into the pores of the porous support which would otherwise occur due to capillary forces. With the capillaries filled with impregnation solvent, there is no driving force for such flow. Polymer intrusion into the pores of the porous support may still occur by diffusion; however, this diffusion occurrence is a slow process and when the appropriate volatile solvents are utilized, rapid evaporation of the solvents occurs and hence the rapid increase in viscosity of the polymer solution which inhibits further diffusion. Typically a consolidated separating layer is obtained using combinations of impregnation solvent and separation layer polymer solution solvent which will provide the described consolidation of the membrane within 1 second to 5 minutes. Satisfactory consolidation of the separating layer is achieved when at least about 90% by weight of the impregnation solvent and polymer solution solvent have been evaporated.

Generally organic polymers, inorganic polymers or organic polymers mixed with inorganics are used to prepare the separating layer. Typical polymers suitable for the separation membrane according to the invention can be substituted or unsubstituted cross-linked or un-cross-linked polymers and may be selected from polysulfones, polyether sulfones, poly(styrenes), including styrene-containing copolymers such as acrylontirilestyrene copolymers, styrene-butadiene copolymers and styrene-vinyl(benzylhalide copolymers); polycarbonates; cellulosic polymers, such as cellulose acetate, cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide), substituted poly(phenylene oxides) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides, polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes such as poly(vinyl formal) and poly(vinyl butyral), poly(vinyl amides), poly(vinyl amines), poly(vinyl urethanes), poly(vinyl ureas), poly(vinyl phosphates) and poly(vinyl sulfates); poly(vinyl silanes); polyalkyls; poly(benzobenzimidazole); polyhydrazides; polyoxadiazoles, polytriazoles, poly(benzimidazole); polycarbodiimides; etc., and interpolymers, including block interpolymers containing repeating units from the above such as interpolymers of acrylonitrile-vinyl bromide-sodium salt of para-sulfophenylmethallyl ethers; and grafts and blends containing any of the foregoing. Typically substituents providing substituted polymers include halogens such as fluorine, chlorine and bromine, hydroxyl groups; lower alkyl groups; lower alkoxy groups; monocyclic aryl; lower acyl groups and the like. The weight percent of polymer in the solution of the separating layer solution may bary widely but is generally in the range from about 0.1 percent to no more than about 10 percent by weight. The solution containing the polymeric material which forms the separating layer must be of a nature which will sufficiently wet the solvent impregnated porous support in order to provide suitable contact with the in situ-formed separating layer to the porous support. Suitable solvents for the solution containing the polymeric material which forms the separating layer include its solvents which have sufficient solubility to form coating solutions of the polymeric materials of the separating layer. These solvents can be selected from normally liquid alkanes, alcohols, ketones, some substituted alkanes, alcohols, ketones and the like; and mixtures thereof.

Generally organic polymers, organic polymers mixed with inorganics, or inorganic materials are suitable for the preparation of the porous support according to the invention. Typical polymers suitable for the porous support according to the invention can be substituted or unsubstituted, cross-linked or uncross-linked polymers as well as copolymers and mixtures thereof. Typical polymers suitable for the porous support are porous membrane materials prepared from the same polymers which are suitable for forming the separating layer. Other suitable porous supports or substrates are inorganics such as porous glass, porous metal, porous ceramics and the like.

Optionally, the composite membrane consisting of a porous substrate and a separating layer, can be in situ coated with one or more additional layers of a highly permeable, non-selective polymer to further improve selectivity.

EXAMPLES

The following table illustrates 12 examples, 11 of which are in accordance with the invention. Example 2 is for comparative purposes and is considered a control example wherein no impregnation solvent was utilized in forming a composite gas separation membrane of the same porous support and polymer solution as in Example 1. As can be seen from comparing the results of Example 1 and Example 2 (control) the permeability of Example 1 wherein 1,2-dichloroethane was used as a impregnation solvent for the porous substrate ranged from 17 to 60 for carbon doxide as compared to the control permeability of only 3.5 for carbon dioxide. This substantial improvement in permeability of carbon dioxide was achieved with some reduction in separation factor for carbon dioxide versus methane, i.e., an alpha of 27 for the control versus an alpha of 11 to 22 for the solvent impregnated for a substrate.

The Examples 1 through 3 utilize the same porous polypropylene support in combination with the various polymer solutions and the same impregnating solvent as shown in Examples 1 and 3 for illustrating the separation of carbon dioxide from methane. Example 4 utilizes porous polypropylene as a support with a silicon formulation polymer solution coating for the separating layer and heptane as the impregnation solvent for demonstrating the separation of oxygen and nitrogen. Examples 5 through 8 and 12 provide various combinations of porous support, polymer solution and impregnation solvent for separating carbon dioxide from methane. Examples 9 and 10 illustrate composite membranes according to the invention for separating hydrogen from methane while Example 11 illustrates a composite membrane according to the invention for separating oxygen from nitrogen.

Due to the many combinations which are utilized in accordance to the invention, and the various gas separations illustrated in the Table, permeability rates and alphas vary substantially from example to example, However, the eleven examples which are in accordance with the invention provide composite membranes which achieve improved permeability rates with a minimum sacrifice of separation factor (alpha) through the use of a solvent impregnation of the porous substrate pores before application of the polymer solutions.

The composite membranes prepared in accordance with the invention, Examples 1, and 3 through 12, were prepared by impregnating pores of the porous support with a solvent to completely fill the pores. Before the solvent evaporates, the impregnated porous support was covered with a 1 to 2 percent by weight solution of separating polymer in a suitable solvent. Excess solution was drained from the membrane and all solvents were allowed to evaporate. The membrane thus coated was dried at room temperature to about 40° C. in a vacuum oven.

Performance testing of the composite membranes as illustrated in the Table, Example 1 through 12, was conducted in a standard test cell wherein the membrane is clamped into position with one side of the membrane at vacuum (30-200 microns mercury) and the other side under pressure of the test gas mixture of approximately 50-150 centimeters mercury. The feed composition for the standard test cell was comprised of air for Examples 4 and 11 and a 25-75 percent by volume carbon dioxide/methane for Examples 1 through 3, 5 through 8, and 12. The feed composition for Examples 10 and 11 was approximately 25 percent to 75 percent by volume of hydrogen to methane. After an equilibrium period of permeability was determined by following the pressure rise on the low pressure side of the membrane as a function of time. Selectivity was calculated by determining the composition of a permeated gas and comparing same to the feed gas composition.

The following visual qualitative test demonstrated the effectiveness of the solvent impregnation method according to the invention. A 0.2% (wt/vol) solution of Thymol Blue in methanol was prepared and applied to one surface of two porous polypropylene discs. One disc was dry and the other impregnated with methanol. After application of the dye, excess dye solution was drained off and the discs allowed to dry. In the disc that was not preimpregnated, the dye was evenly distributed between top and bottom surfaces. In the preimpregnated disc the top surface was clearly more strongly dyed than the bottom surface, indicating retardation of the flow of the dye solution into the pores.

TABLE

| Example | Porous Support | Polymer Solution | Impregnation Solvent | $(P/l)CO_2 \times 10^6$ | $\alpha CO_2/CH_4$ |
| --- | --- | --- | --- | --- | --- |
| 1 | Porous Polypropylene (Celgard 2402) | 2% Cellulose Triacetate in $CH_2Cl_2$-5% $CH_3OH$ | 1,2-dichloroethane | 17-60 | 11-22 |
| 2 | Porous Polypropylene (Celgard 2402) | 2% Cellulose Triacetate in $CH_2Cl_2$-5% | none (control) | 3.5 | 27 |

TABLE-continued

| Example | Porous Support | Polymer Solution | Impregnation Solvent | $(P/l)CO_2 \times 10^6$ | $\alpha CO_2/CH_4$ |
|---|---|---|---|---|---|
| 3 | Porous Polypropylene (Celgard 2402) | 4% PPO in CHCl$_3$ (silicone post-coated) | 1,2-dichloroethane | 18 | 8 |
| 4 | Porous Polypropylene (Celgard 2402) | 1% A-1100 (—02) Silicone formulation | heptane | $(P/l)O_2 = 322$ | $\alpha O_2/N_2 = 1.7$ |
| 5 | Porous Polypropylene (Celgard 2402) | 1.7% poly[(trifluoroethoxy) phosphazene] in THF | THF | 128 | 8.5 |
| 6 | Porous Polypropylene (Celgard 2402) | 1% polyphosphazene in THF (silicone post-coated) | Dioxane | 153 | 7.6 |
| 7 | Vycor porous glass tube (Corning 7930) | 2% Cellulose triacetate in CH$_2$Cl$_2$-5% CH$_3$OH | 1,2-dichloroethane | 18 | 17 |
| 8 | Vycor porous glass tube (Corning 7930) | 2% Cellulose triacetate in CH$_2$Cl$_2$-5% CH$_3$OH (silicone top coated) | 1,2-dichloroethane | 11 | 27 |
| 9 | Vycor porous glass tube (Corning 7930) | 2% Cellulose triacetate in CH$_2$Cl$_2$-5% CH$_3$OH | 1,2-dichloroethane | $(P/l)O_2 = 17$ | $\alpha H_2 CH_4 = 34$ |
| 10 | Vycor porous glass tube (Corning 7930) | 2% PES in CH$_2$Cl$_2$-5% CH$_3$OH (silicone top coated) | CH$_2$Cl$_2$—CH$_3$OH | $(P/l)H_2 = 7$ | $\alpha H_2/CH_4 = 17$ |
| 11 | Vycor porous glass tube (Corning 7930) | 1% polymethylpentene in cyclohexane | Cyclohexane | $(P/l)O_2 = 22$ | $\alpha O_2/N_2 = 2.5$ |
| 12 | Vycor porous glass tube (Corning 7930) | 1.7% poly(trifluoroethoxy phosphazene) in THF | THF | 47 | 2.3 |

We claim:

1. A process for forming a composite fluid separation membrane comprising:
    (a) impregnating a preformed porous support having pores extending there through with a volatile solvent;
    (b) forming in situ a separating layer on one or both surfaces of the porous support from a solution of a polymer having fluid separation capabilities;
    (c) evaporating the impregnation solvent while simultaneously evaporating the separating layer polymer solution solvent, the evaporation occurring before substantial diffusion of the separating layer polymer into the pores of the porous substrate; and
    (d) achieving a composite fluid separation membrane having improved permeability rates.

2. The process for forming a composite fluid separation membrane according to claim 1 wherein the impregnating solvent is comprised of a solvent having a solubility parameter within about ±2 of the solubility parameter of the polymer which forms the separating layer.

3. The process for forming a composite fluid separation membrane according to claim 1 wherein the rapid evaporation is achieved within 1 second to about 5.0 minutes.

4. The process for forming a composite fluid separation membrane according to claim 1 wherein the impregnation solvent and the solvent of the separating polymer solution have boiling point ranges which differ by less than 50° C.

5. The process for forming a composite fluid separation membrane according to claim 1 wherein the impregnation solvent has a boiling point ranging from about 40° C. to about 100° C. at atmospheric pressure.

6. A process for forming a composite fluid separation membrane comprising:
    (a) impregnating a preformed porous support having pores extending there through with a volatile solvent;
    (b) forming in situ an intermediate layer on one or both surfaces of the porous support from a solution of a polymer having high permeabilities for fluid separations;
    (c) evaporating the impregnation solvent simultaneously with the evaporation of the intermediate layer solution polymer solvent;
    (d) forming in situ a separating layer on the intermediate layer; and
    (e) achieving a composite fluid separation membrane having improved permeability.

7. A process for forming an ultrathin encapsulation membrane for encapsulating materials supported on porous support, comprising:
    (a) impregnating the supported materials and the supporting porous support with a solvent; and
    (b) forming an in situ encapsulation membrane from a solution of polymer of the encapsulation membrane, the in situ formation occurring as a result of simultaneous evaporation of the impregnation solvent and the solvent of the polymer solution.

8. The process for forming an ultrathin encapsulation membrane according to claim 7 wherein the material is selected from the group consisting of catalyst, herbicides, medications, fertilizers, and enzymes.

9. A process for forming an ultrathin encapsulation membrane for encapsulating a porous material, comprising:

(a) impregnating the pores of the material with a solvent;
(b) forming in situ an encapsulation membrane of the surface of the porous material from a solution of a polymer which forms the membrane as a result of simultaneous evaporation of the impregnation solvent and the solvent of the polymer solution.

* * * * *